Aug. 19, 1930.  E. VOITURON  1,773,655
LEAD COLUMN, PIPE, OR THE LIKE
Filed May 17, 1928
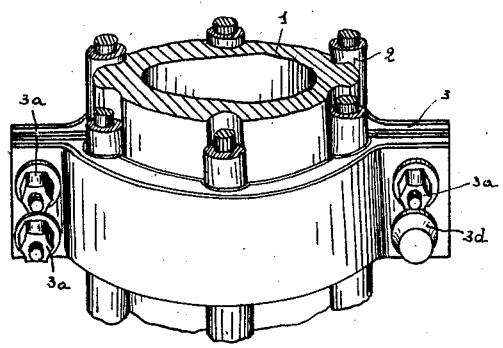
Inventor:
Edmond Voituron
by
Langner Parry Card & Langner
Attys.

Patented Aug. 19, 1930

1,773,655

UNITED STATES PATENT OFFICE

EDMOND VOITURON, OF BRUSSELS, BELGIUM, ASSIGNOR TO SOCIETE BELGE DE L'AZOTE, OF OUGREE, BELGIUM

LEAD COLUMN, PIPE, OR THE LIKE

Application filed May 17, 1928, Serial No. 278,511, and in Belgium May 20, 1927.

It is known to use, in connection with operations involving the use of acids and solutions or products which are corrodent to ordinary metals, columns or piping and the like, made of soft or hard lead and externally reinforced with rods coated with lead and formed of iron or of other metal disposed along the generating lines of the said columns or pipes. These rods however were not removable because they were integrally united to the pipe.

The present invention aims at providing removable reinforcing members of iron coated with lead, and means for securing the said members to the piping while affording free play to the expansion of both, for the purpose of preventing the protected piping from being damaged.

The reinforcing elements are constituted by rods formed of metal coated with lead disposed in grooves cut in the periphery of the lead columns, pipes or the like. These elements are suitably held in position on the pipes, columns, etc., with the aid of clamps formed of iron coated with lead which may be held together by bronze bolts protected by lead caps.

A constructional example of the means according to this invention is illustrated in the accompanying drawing, the figure being a perspective view of a clamp for holding the reinforcing means on a pipe.

In the drawing the pipe 1 is externally grooved along some of its generatrices, the grooves receiving the reinforcing members 2 formed of iron coated with lead, held in position by means of a clamp 3 the various elements of which are held together by bolts 3ª protected by lead caps 3ᵈ.

What I claim is:

1. In combination with lead columns, lead piping and the like, removable rods of iron coated with lead located in grooves cut along generatrices of the said columns, piping and the like, means for fixing said rods to the piping and affording free play to expansion, and means for avoiding corrosion of said rods and fixing means.

2. In combination with lead columns, lead piping and the like, removable rods of iron coated with lead located in grooves cut along generatrices of the said columns, lead piping and the like, and a clamp formed of iron coated with lead for clamping parts for fixing said rods to the piping.

3. In combination with lead columns, lead piping and the like, removable rods of iron coated with lead located in grooves cut along generatrices of the said columns lead piping and the like, a clamp formed of iron coated with lead for clamping parts for fixing said rods to the piping, bronze bolts assembling the parts of said clamp, the lead caps protecting said bolts.

In testimony whereof I have affixed my signature.

EDMOND VOITURON.